(No Model.)
G. CRUTTENDEN, Jr.
BOLT.
No. 261,588. Patented July 25, 1882.
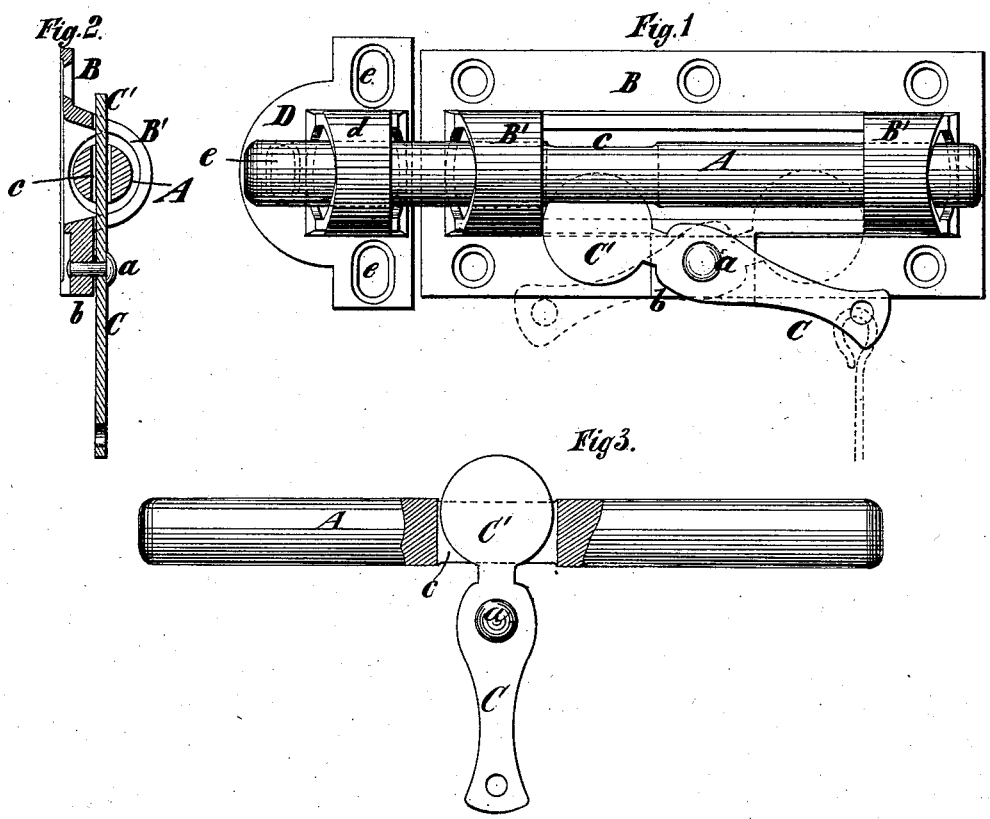
WITNESSES
INVENTOR
George Cruttenden Jr.
By his Atty.
Edwin H. Brown

UNITED STATES PATENT OFFICE.

GEORGE CRUTTENDEN, JR., OF MONTCLAIR, NEW JERSEY, ASSIGNOR TO MARY L. CRUTTENDEN, OF SAME PLACE.

BOLT.

SPECIFICATION forming part of Letters Patent No. 261,588, dated July 25, 1882.

Application filed November 2, 1881. (No model.)

*To all whom it may concern:*

Be it known that I, GEORGE CRUTTENDEN, Jr., of Montclair, in the county of Essex and State of New Jersey, have invented certain new and useful Improvements in Bolts, of which the following is a specification.

My invention relates to that class of bolts in which a lever is arranged between the two bearers of the bolt and engages with one or the other of two shoulders on the bolt for moving it into or out of engagement with its keeper.

The invention consists in the combination, with a bolt and bearers therefor, of a lever arranged between the bearers engaging with the bolt between two shoulders, and adapted to impel the bolt in either direction, and to have its head, which engages with the bolt, jammed against either bearer after moving the bolt to its greatest extent, so as to lock the bolt in position. The lever preferably has a round or disk-like head, which is eccentric to the pivot of the lever.

The invention also consists in the combination, with a bolt having a rounded or tapered end, and bearers therefor, of a keeper or catch-piece provided with holes for receiving screws or nails, elongated transversely to the bolt, and adapted to be moved by the rounded or tapered end of the bolt into line therewith.

In the accompanying drawings, Figure 1 is a side or face view of a bolt and appurtenances embodying my invention. Fig. 2 is a transverse section of the same, and Fig. 3 represents a partly-sectional side view of the bolt and the lever detached from other parts.

Similar letters of reference designate corresponding parts in all the figures.

A designates a bolt, which may be of any suitable form, but is here shown as cylindrical.

B designates a base-plate, and B' B' designate bearers in which the bolt is supported and works.

C designates a lever, which is fulcrumed on a pin, *a*, affixed to a projection, *b*, on the base-plate B. It has a rounded cam-like end or head, C', which enters a slot, *c*, in the bolt A, and is eccentric to the pin or pivot *a*. It will be understood that by shifting this lever one way or the other the bolt may be impelled in either direction, and that as the lever fits within the bolt it prevents the latter from turning, as it would otherwise be liable to do when made of cylindric form. When the lever is moved as far as possible it is so nearly in line with the bolt that a force applied in the direction of the length of the bolt cannot move the bolt. Therefore the lever forms a means for locking the bolt in position. The rounded cam-like end C' of the lever impinges against either bearer B' when the bolt is moved to the fullest extent, and the lever is thereby prevented from becoming disengaged from the bolt. Moreover, as the lever jams or binds against the bearers when thus engaged with them, the bolt is additionally secured against movement under the influence of force applied to it. The rounded cam-like end C', acting on the shoulders at the ends of the slot in the bolt, works with less friction than if the end of the lever were otherwise shaped, and as the cam-like disk-head C' of the lever C fits closely in the slot at all times there is very little lost motion between the two. Obviously, if the bolt were made square or polygonal, so that it would not turn in its bearers, the lever might work between two pins or projections forming shoulders, instead of a slot.

D designates the keeper or catch-piece for the bolt. It may be of the usual or any other suitable form, though I prefer to make its loop *d* somewhat thicker and stronger than the bearers B' of the bolt. As here shown, the keeper or catch-piece is designed to be secured in place by screws, and has holes or openings *e*, through which the screws may pass. These holes or openings are elongated transversely to the bolt, so that by slackening the screws the keeper or catch-piece may be adjusted transversely to the bolt. It may be secured in position again by retightening the screws.

It will be observed that the ends of the bolt A are slightly rounded or tapered, and therefore when the keeper is not in line with the bolt it will be adjusted into line by the rounded or tapered end of the bolt entering it. Where a square-ended bolt is used it would not so readily adjust the keeper into line with it, because if the keeper were considerably out of line the square end of the bolt would strike directly against it, and would not enter it. My round or tapered ended bolt will adjust the keeper when it is greatly out of line, and when a square-ended bolt would not so adjust it.

What I claim as my invention, and desire to secure by Letters Patent, is—

1. The combination, with a bolt and bearers therefor, of a lever arranged between the bearers, engaging with the bolt between two shoulders, and adapted to impel the bolt in either direction, and to have its head, which engages with the bolt, jammed against either bearer after moving the bolt to the greatest extent, so as to lock the bolt in position, substantially as specified.

2. The combination, with the bolt A, having the slot $c$, and the base-plate B, having bearers B' B', of the lever C, pivoted to the base-plate at $a$, and having the round disk-like head C', eccentric to the pivot $a$, fitting said slot and adapted to be jammed against either bearer, substantially as specified.

3. The combination, with a bolt having a rounded or tapered end, and bearers therefor, of a keeper or catch-piece provided with holes for receiving screws or nails, elongated transversely to the bolt, and adapted to be moved by the rounded or tapered end of the bolt into line therewith, substantially as specified.

GEORGE CRUTTENDEN, Jr.

Witnesses:
T. J. KEANE,
JAMES R. BOWEN.